(12) United States Patent
Choudhury et al.

(10) Patent No.: US 10,276,162 B2
(45) Date of Patent: Apr. 30, 2019

(54) METHOD AND ELECTRONIC DEVICE FOR PERFORMING VOICE BASED ACTIONS

(71) Applicant: SAMSUNG ELECTRONICS CO., LTD., Suwon-si (KR)

(72) Inventors: Arunabha Choudhury, Bangalore (IN); Sriram Nagaswamy, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/429,715

(22) Filed: Feb. 10, 2017

(65) Prior Publication Data

US 2017/0236513 A1    Aug. 17, 2017

(30) Foreign Application Priority Data

Feb. 12, 2016   (IN) .............................. 201641004997
Dec. 5, 2016    (IN) .............................. 201641004997

(51) Int. Cl.
*G10L 15/06*     (2013.01)
*G10L 15/22*     (2006.01)
*G10L 15/18*     (2013.01)

(52) U.S. Cl.
CPC ............ *G10L 15/22* (2013.01); *G10L 15/063* (2013.01); *G10L 15/1815* (2013.01); *G10L 15/1822* (2013.01); *G10L 2015/0635* (2013.01); *G10L 2015/223* (2013.01); *G10L 2015/228* (2013.01)

(58) Field of Classification Search
CPC ... G10L 15/22; G10L 15/063; G10L 15/1822; G10L 15/1815; G10L 2015/228; G10L 2015/223; G10L 2015/0635; G10L 15/065; G10L 15/07; G10L 15/20; G10L 2015/0631
See application file for complete search history.

(56) References Cited

U.S. PATENT DOCUMENTS

| 7,933,226 B2* | 4/2011 | Woodruff ............. H04M 3/568 370/260 |
| 8,315,878 B1* | 11/2012 | Burns .................... G10L 15/22 704/231 |
| 8,538,757 B2* | 9/2013 | Patch .......................... 704/251 |
| 8,958,848 B2* | 2/2015 | Shin .................. H04M 1/72583 455/563 |

(Continued)

FOREIGN PATENT DOCUMENTS

| EP | 2575128 A2 | 4/2013 |
| WO | 2015/179510 A1 | 11/2015 |
| WO | 2015/184186 A1 | 12/2015 |

OTHER PUBLICATIONS

International Search Report (PCT/ISA/210) dated May 25, 2017, issued by the International Searching Authority in counterpart International Patent Application No. PCT/KR2017/001495.

(Continued)

*Primary Examiner* — Marcus T Riley
(74) *Attorney, Agent, or Firm* — Sughrue Mion, PLLC

(57) ABSTRACT

A method performing voice based actions by an electronic device includes receiving a voice command from a user; determining a relationship between the voice command and a context a historic voice command of the user, and performing an action by executing the voice command based on the context of the historic voice command.

20 Claims, 23 Drawing Sheets

(56) References Cited

U.S. PATENT DOCUMENTS

| | | | |
|---|---|---|---|
| 9,070,366 B1* | 6/2015 | Mathias | G06F 17/279 |
| 2004/0054539 A1* | 3/2004 | Simpson | G10L 15/30 |
| | | | 704/270.1 |
| 2008/0091406 A1 | 4/2008 | Baldwin et al. | |
| 2008/0103781 A1* | 5/2008 | Wasson | G10L 15/22 |
| | | | 704/277 |
| 2009/0150156 A1* | 6/2009 | Kennewick | G06Q 30/0261 |
| | | | 704/257 |
| 2010/0169098 A1* | 7/2010 | Patch | 704/275 |
| 2011/0055256 A1* | 3/2011 | Phillips | G10L 15/30 |
| | | | 707/769 |
| 2011/0301943 A1* | 12/2011 | Patch | G10L 15/265 |
| | | | 704/9 |
| 2013/0204622 A1 | 8/2013 | Lu et al. | |
| 2014/0258324 A1* | 9/2014 | Mauro | G06F 17/30392 |
| | | | 707/766 |
| 2014/0317502 A1* | 10/2014 | Brown | G06F 9/453 |
| | | | 715/706 |
| 2015/0003595 A1* | 1/2015 | Yaghi | G06Q 10/063 |
| | | | 379/85 |
| 2015/0042587 A1 | 2/2015 | Jung et al. | |
| 2015/0142704 A1* | 5/2015 | London | G06N 5/04 |
| | | | 706/11 |
| 2015/0161997 A1 | 6/2015 | Wetsel et al. | |
| 2015/0348547 A1* | 12/2015 | Paulik | G10L 15/19 |
| | | | 704/251 |
| 2017/0236513 A1* | 8/2017 | Choudhury | G10L 15/063 |
| | | | 704/244 |

OTHER PUBLICATIONS

Written Opinion (PCT/ISA/237) dated May 25, 2017, issued by the International Searching Authority in counterpart International Patent Application No. PCT/KR2017/001495.

Communication dated Jan. 23, 2019, issued by the European Patent Office in counterpart European Patent Application No. 17750469.3.

* cited by examiner

METHOD AND ELECTRONIC DEVICE FOR PERFORMING VOICE BASED ACTIONS

CROSS-REFERENCE TO RELATED APPLICATIONS

The present application claims priority from Indian Provisional Application No. 201641004997 filed Feb. 12, 2016, and Indian Application No. 201641004997 filed Dec. 5, 2016, the entire disclosures of which are incorporated herein by reference.

BACKGROUND

1. Field

Apparatuses and methods consistent with exemplary embodiments relate to retrieving information and, more particularly, to performing voice based actions.

2. Related Art

An electronic device uses a voice recognition system to recognize an utterance from a user, as for example, a speech vocabulary sequence from a user voice, a voice search command, etc., which is accepted as an input to the voice recognition system. For example, information delivery systems may include a voice portal, a navigation system, and a voice search to explore the content of the applications (supported by voice based search), etc.

For example, the related art voice recognition system may receive a user input (i.e., voice command, voice query, and/or voice search query), in a voice based search application or any other application related thereof, such as, "Open Bluetooth". The voice recognition system may process the voice query and provide an output to the voice query provided by the user, as for example, enabling the Bluetooth application.

Further, if the user inputs another voice query, such as "find nearby devices" the voice recognition system may process the voice query and may start searching for the term "find nearby devices", instead of searching/providing the lists of nearby devices via the Bluetooth application.

That is, the related art voice search system is restricted to one hop breadth search which covers a wide range of topics and/or items. When the user searches for the item, the information corresponding to the item is retrieved and the search terminates at the result. Further, the electronic device (or, the voice recognition system) does not provide with a provision to the user in navigating back to the previously queried/explored item of the application/or any other application related thereof.

Further disadvantage with the one hop search is that the user interaction with the electronic device is a mixture of voice and touch and there is no means to navigate within the perspective of the result without switching from the voice to touch.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments may provide a method for receiving a voice command from a user.

One or more exemplary embodiments may provide a method for determining a relationship between the voice command and a context of at least one historic voice command of the user.

One or more exemplary embodiments may provide a method for performing at least one action by executing the voice command based on the context.

One or more exemplary embodiments may provide a method for receiving a first voice command associated with a first application from a user.

One or more exemplary embodiments may provide a method for determining a relationship between the first voice command and a context of at least one historic voice command associated with the first application.

One or more exemplary embodiments may provide a method for performing at least one action by executing the voice command based on the context of at least one historic voice command associated with the first application.

One or more exemplary embodiments may provide a method for receiving a second voice command associated with a second application from the user.

One or more exemplary embodiments may provide a method for determining a relationship between the second voice command and the context of at least one historic voice command associated with the first application.

One or more exemplary embodiments may provide a method for performing at least one action by executing the second voice command based on the context of at least one historic voice command associated with the first application.

According to an aspect of an exemplary embodiment there is provided a method for performing voice based actions by an electronic device, the method including receiving a first voice command from a user, determining a relationship between the first voice command and a context of at least one historic voice command of the user, and performing at least one action by executing the first voice command based on the context.

According to an aspect of another exemplary embodiment there is provided an electronic device for performing voice based actions, the electronic device including an audio receiver configured to receive a first voice command from a user, and a processor configured to determine a relationship between the first voice command and a context of at least one historic voice command of the user and perform at least one action by executing the first voice command based on the context.

BRIEF DESCRIPTION OF DRAWINGS

The above and/or other aspects will be more apparent by describing certain exemplary embodiments with reference to the accompanying drawings, in which.

DETAILED DESCRIPTION

Figure 1A:
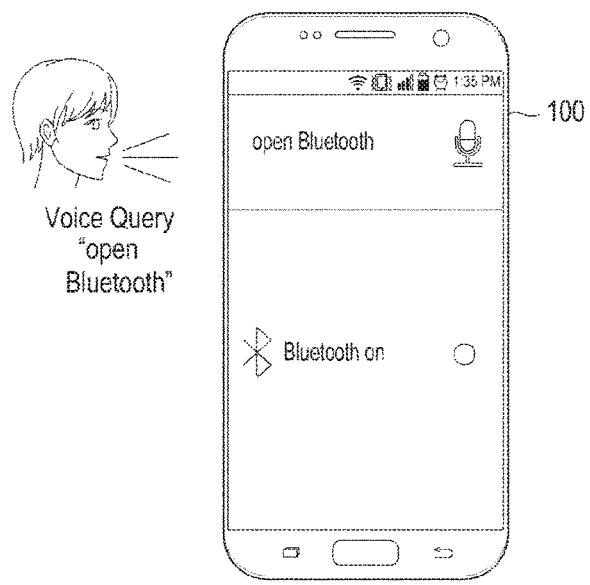
FIGS. 1A and 1B illustrate an exemplary configuration of an electronic device.

Certain exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

The various embodiments described herein are not necessarily mutually exclusive, as some exemplary embodiments may be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting.

Figure 1B:
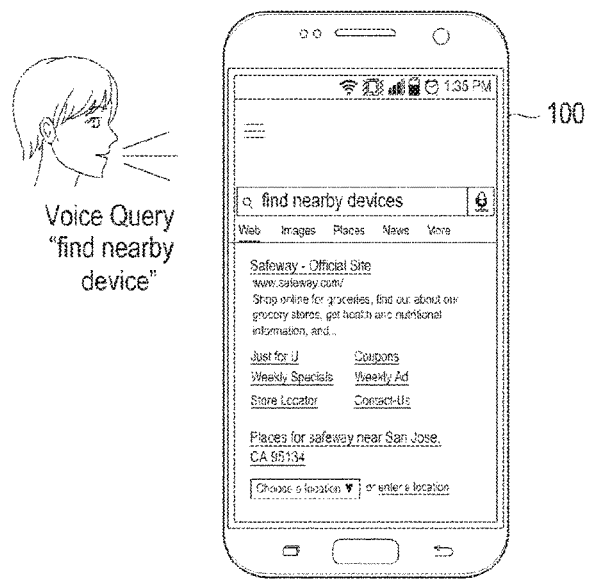

FIGS. 1A and 1B illustrate an exemplary configuration (i.e., screen shot of the electronic device 100) performing one or more functionalities of the related art voice recognition system. The related art voice recognition system may receive a user input (i.e., voice command/voice query/voice search query), in a voice based search application or any other application related thereof, such as, "Open Bluetooth". The voice recognition system in the electronic device 100 may process the voice query and provide an output to the voice query provided by the user. As shown in the FIG. 1A, based upon the voice query, the "Bluetooth application" is enabled.

Further, if the user inputs another voice query, such as "find nearby devices" the voice recognition system may process the voice query and provide an output to the another voice query. As shown in the FIG. 1B, based upon the another voice query, the search application may start searching for the term "find nearby devices", instead of searching/providing the lists of nearby devices via the Bluetooth application.

Figure 2A:
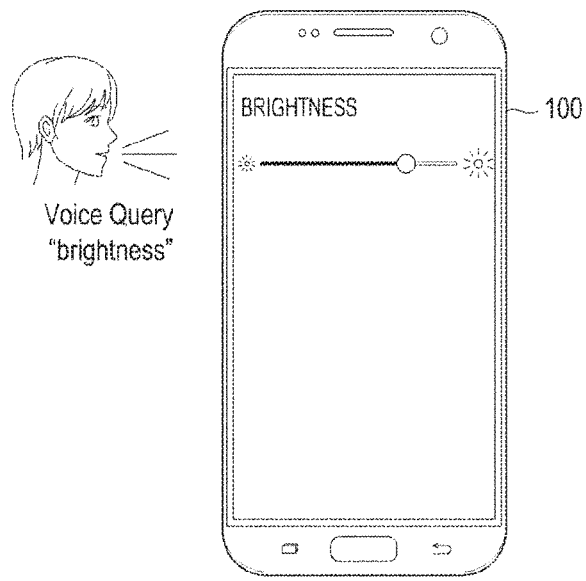
FIGS. 2A and 2B illustrate another exemplary configuration of an electronic device.
Figure 2B:
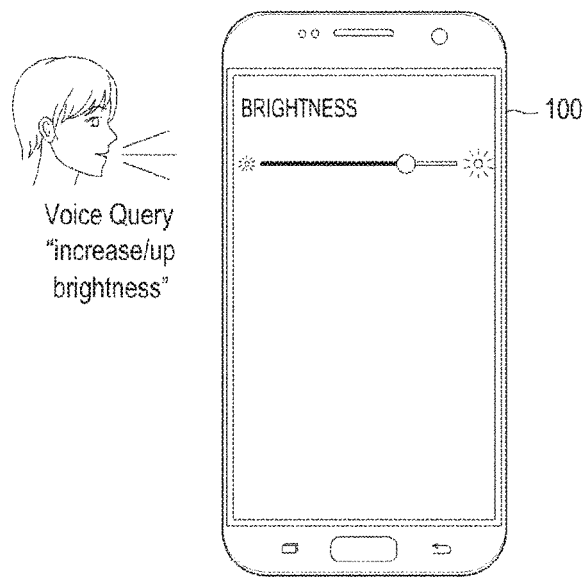

In another example as shown in FIG. 2A, if the user inputs via voice command, voice query, and/or voice search query, the first query "brightness", the electronic device 100 may pop-up/display the "brightness slider" of the electronic device 100. Further, if the user inputs second voice query in order to perform any action related to the application (i.e., "the brightness"), the action may performed, such as "increase the brightness level, as shown in FIG. 2B. The electronic device 100 provides no response to the action as requested by the user through the second voice query. Further, there is no support for brightness slider control, thus touch control has to be used.

Figure 3A:
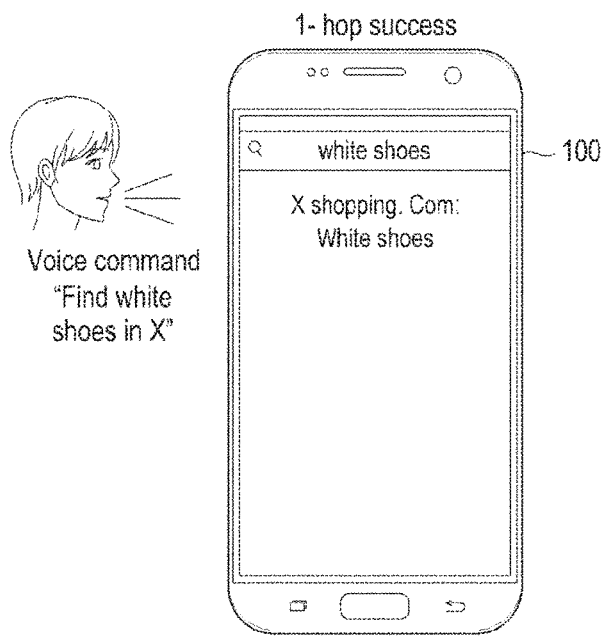
FIGS. 3A and 3B illustrate yet another exemplary configuration of an electronic device.
Figure 3B:
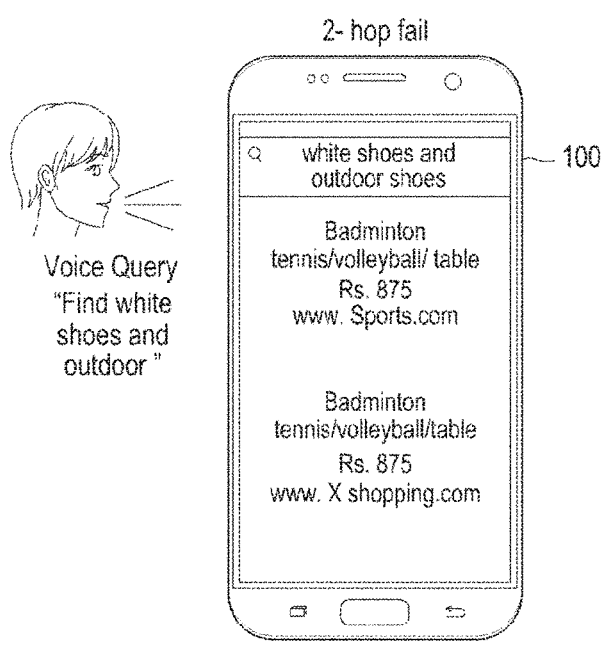

In yet another example as shown in FIG. 3A, the user inputs (i.e., first voice input/query, voice command/voice query/voice search query) in any of the e-commerce application or any other application related thereof, a first voice query; "white shoes" in the application. The electronic device 100 provides the lists of the "white shoes" available in the application to the user. Further, if the user inputs second user input, such as; "white sports and outdoor shoes" in the application thereto, the application does not provide the output as required by the user through the second user input, as shown in FIG. 3B.

Figure 4A:
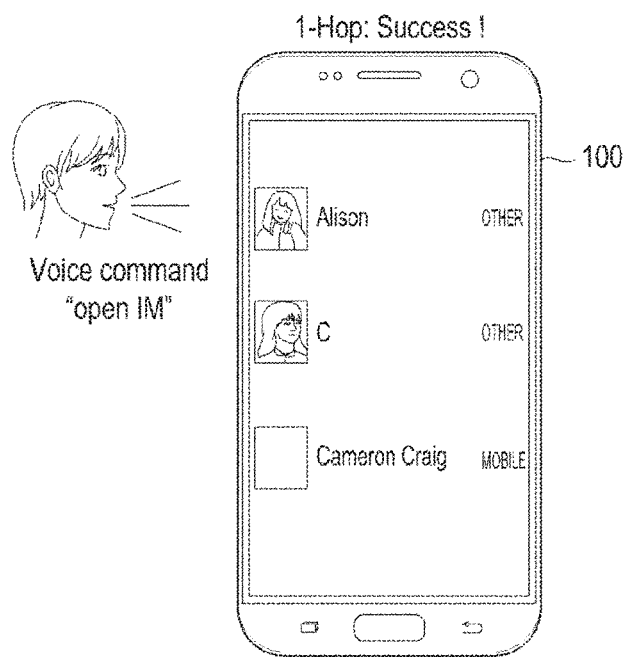
FIGS. 4A and 4B illustrate yet another exemplary configuration of an electronic device.
Figure 4B:
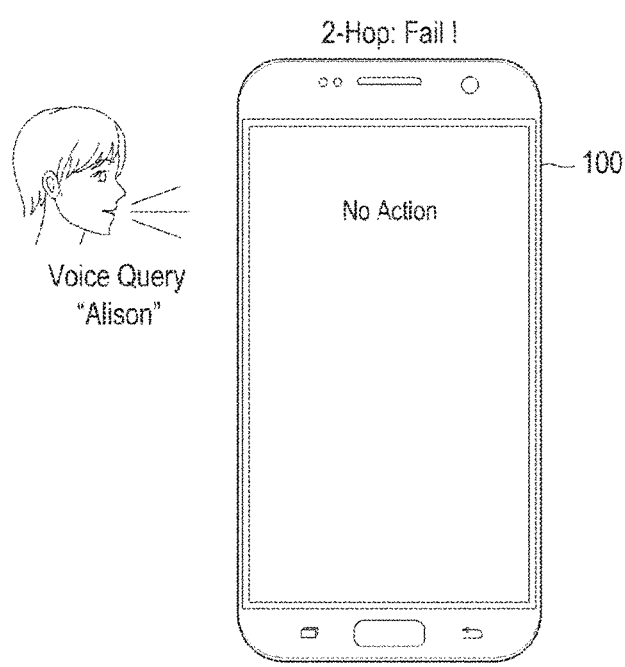

In yet another example as shown in FIG. 4A, the user queries (i.e., first voice query) to open instant messaging (IM) application. The instant messaging application is opened and the voice search ends. Thus, if the user inputs second voice query, such as; "Alison," the electronic device 100 (or, the associated IM application in the electronic device 100) may fail, as shown in FIG. 4B, to fetch the conversation belonging to the "Alison," as requested by the user through the second voice query.

Figure 5A:
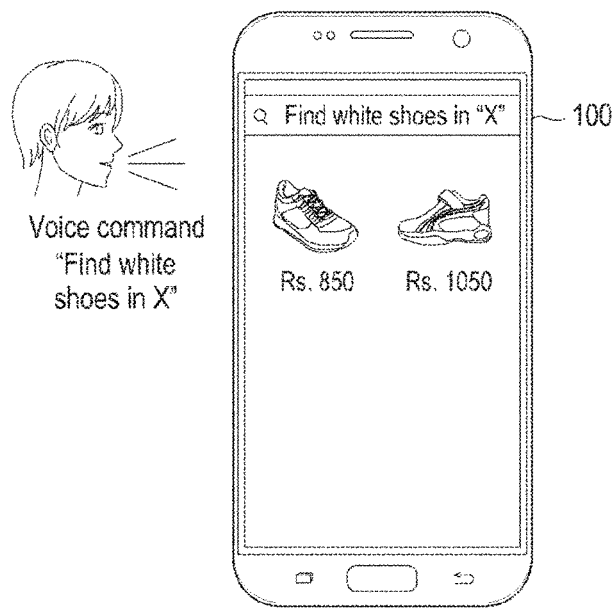
FIGS. 5A, 5B, and 5C illustrate yet another exemplary configuration of an electronic device.
Figure 5B:
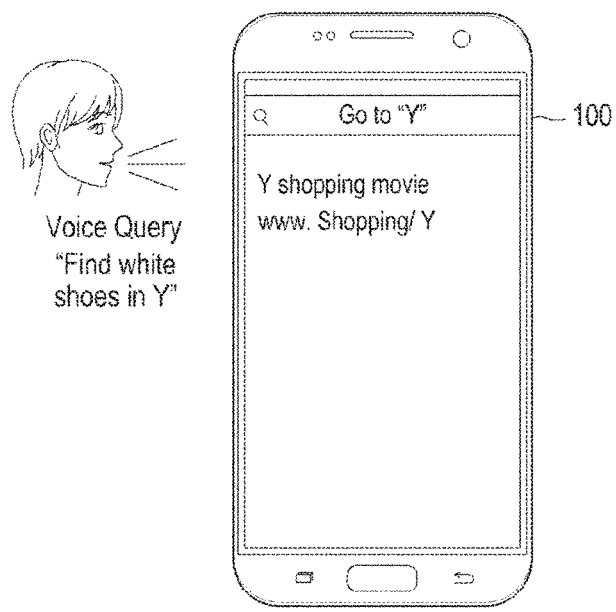
Figure 5C:
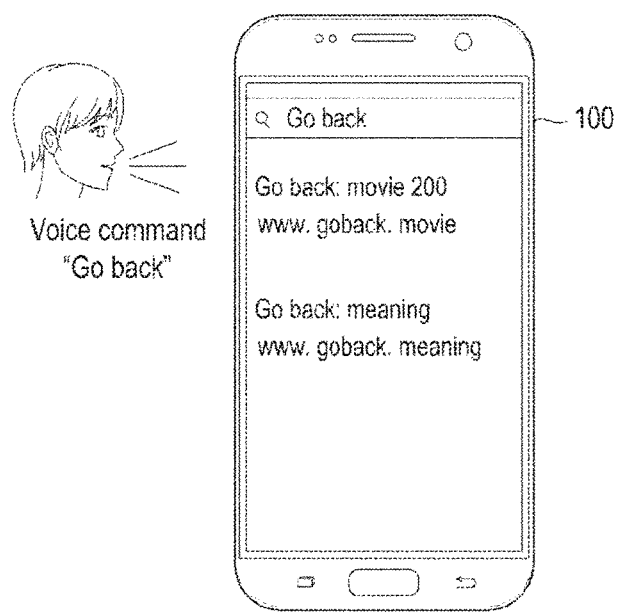

Yet another example is illustrated in FIGS. 5A, 5B, and 5C, in which the user queries (i.e., first query) the current application, with a term "go back" (for example, navigating back to the previously queried term/application). The current application may therefore start searching for the term "go back" instead of navigating back/going back to a previously queried term/application (if any).

Figure 6A:
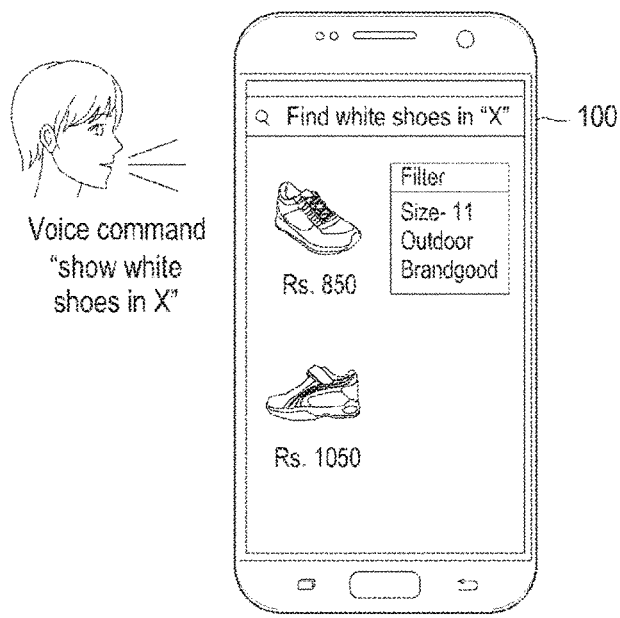
FIGS. 6A and 6B illustrate yet another exemplary configuration of an electronic device.
Figure 6B:
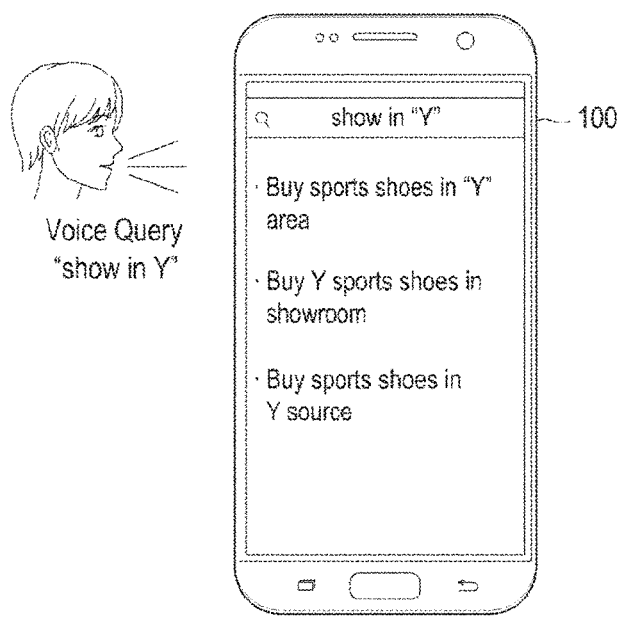

Yet another example as illustrated in FIGS. 6A and 6B, the electronic device might not be able to automatically apply the search query and search filter of "X" application into a "Y" application, whenever the user launches the "Y" application while viewing a content in the "X" application. As a result, the user might have to repeat the search term (i.e., white shoes) and the filers (brand, size, etc.) applied to it, which is redundant.

Accordingly, one or more exemplary embodiments may provide a method for performing voice based actions by an electronic device. The method includes receiving a voice command from a user. Further, the method includes determining a relationship between the voice command and a context of at least one historic voice command of the user. Furthermore, the method includes performing at least one action by executing the voice command based on the context.

One or more exemplary embodiments may provide yet another method for performing voice based actions by an electronic device. The method includes receiving a first voice command associated with a first application from a user. Further, the method includes determining a relationship between the first voice command and a context of at least one historic voice command associated with the first application. Further, the method includes performing at least one action by executing the voice command based on the context of at least one historic voice command associated with the first application. Further, the method includes receiving a second voice command associated with a second application from the user, determining a relationship between the second voice command and the context of at least one historic voice command associated with the first application and performing at least one action by executing the second voice command based on the context of at least one historic voice command associated with the first application.

One or more exemplary embodiments may provide an electronic device for performing voice based actions. The electronic device includes an audio receiver configured to receive a voice command from a user, a context identification unit configured to determine a relationship between the voice command and a context of at least one historic voice command of the user and a processor configured to perform at least one action by executing the voice command based on the context.

One or more exemplary embodiments may provide yet another electronic device for performing voice based actions. The electronic device includes an audio receiver configured to receive a first voice command associated with a first application from a user, a context identification unit configured to determine a relationship between the first voice command and a context of at least one historic voice command associated with the first application, a processor configured to perform at least one action by executing the voice command based on the context of at least one historic voice command associated with the first application. Further, the audio receiver configured to receive a second voice command associated with a second application from the user, the context identification unit configured determine a relationship between the second voice command and the context of at least one historic voice command associated with the first application, and the processor configured to perform at least one action by executing the second voice command based on the context of at least one historic voice command associated with the first application.

One or more exemplary embodiments may allow the electronic device to perform automatic context switching based on classification of a natural language query (i.e., without any specific voice command) to be one of a search and an action.

One or more exemplary embodiments may allow the user to interact intuitively with the electronic device, a completely intangible interaction with the electronic device especially when hands are not free, as for example while driving, cooking, or exercising.

One or more exemplary embodiments may allow the electronic device to not only perform the search for the item on the web application/or any other application related thereof, but also aids in navigating the user, by way of the electronic device, by interacting with the electronic device using the natural language.

One or more exemplary embodiments may allow the user with multi hop navigation and depth search as opposed to breadth search in most personal assistance software. The proposed method provides a complete Artificial intelligence (AI) based interaction between the user and the electronic device. Thus, providing a two-dimensional (2D) voice search (i.e., multi-hop search, backward navigation, etc.) feature to the user.

In one or more exemplary embodiments, there is no notion of the electronic device for each state since number of possible states is infinite. Further, the proposed method obviates the necessity to explicitly specify the context by the user, thus making the search process convenient to the user.

Further, according to the related art method, if the user queries "volume" to see current volume level, thereon, if the user wants to take volume level up/down. The user queries "volume up/down" each time to change volume level up/down. Unlike the related art method, in one or more exemplary embodiments, if the user queries "volume" to see current volume level, the volume slider launches and context ("volume") is stored. The user only uses query "up/down" to take the volume up or down. The user can use keyword "up/down by five" instead of "volume up/down by five" each time.

Further, in a related art method, if the user queries "open browser" in Television (TV), the browser opens in the TV. And, the user switches to remote for browsing. Unlike the related art method, in one or more exemplary embodiments, when the user queries "open browser" in the TV, the browser opens in the TV, and then the user browses using voice commands. Thus, in one or more exemplary embodiments, the voice assistance flow is now more intuitive, the user need not repeatedly use long queries since the most recent context is preserved. Navigating TV menu is much easier using voice commands as there is no need to memorize all menu items.

Figure 7:
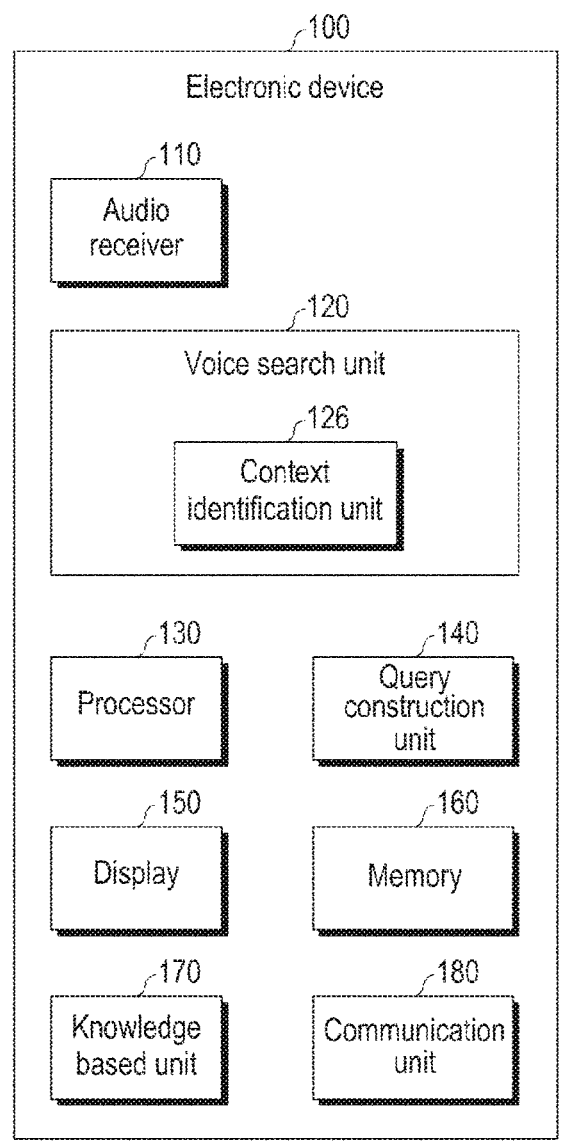
FIG. 7 illustrates an electronic device configured to perform one or more voice based actions, according to an exemplary embodiment.

FIG. 7 illustrates an electronic device 100 for performing one or more voice based actions, according to an exemplary embodiment.

Referring to FIG. 7, the electronic device 100 may be, for example, a mobile device, a wearable device, a laptop computer, a desktop computer, a smart television, a smart display, a notebook computer, a notebook, a tablet or a mobile device such as a mobile phone, internet of things (IoT), portable media player such as personal music player and personal video player, or any consumer electronic devices capable of transmitting and receiving voice, text, audio, speech, image, or video data. Other forms of data processing device are within the scope of the exemplary embodiments discussed herein.

The electronic device 100 includes an audio receiver 110, e.g., a microphone, a voice search unit 120 including a context identification unit 126, a processor 130, as for example, a hardware unit, a microprocessor, an apparatus, a Central Processing Unit (CPU), a Graphics Processing Unit (GPU), communicatively coupled to the audio receiver 110, a query construction unit 140, a display 150 (e.g., a Cathode Ray Tube (CRT) display, a Liquid Crystal Display (LCD)), a Light-emitting diode (LED) being interfaced with the processor 130, a memory 160 (e.g., a volatile memory and/or a non-volatile memory) communicatively coupled to the processor 130, a knowledge based unit 170, and a communication unit 180, e.g., a communication interface, a transceiver, etc. The memory 160 may include storage locations configured to be addressable through the processor 130.

An exemplary embodiment may allow a user to input a voice query (i.e., search query, voice command, etc.) through the user own speech/utterance and conveniently receive search result data including text, audio, speech, image and video data.

The audio receiver 110 may include for example, voice recognition system, voice recognition unit, etc. The audio receiver 110 may receive the voice command from the user. The voice command may include for example, an utterance, a voice note, voice speech, a voice text, etc. A speech to text unit (not shown) may be configured to convert the voice command from speech to text and the text may be transmitted to a Query parser unit (not shown).

The voice search unit 120 includes a Natural Language Understanding (NLU) engine (now shown) and a knowledge base engine (not shown). The NLU engine receives the parsed query from the Query parser unit. Further, the NLU engine classifies the parsed query based on the type of query (search, retrieve or perform another action) and identifies the context of the query. Further, the NLU engine transmit the identified context to the knowledge base engine. The knowledge base engine maps the identified action word to an actual action based on the context of the query.

The context identification unit 126 is configured to determine the relationship between the voice command and the context of at least one historic voice command of the user. The relationship is determined based on the at least one of the semantic similarity, a latent semantic similarity, and the action performed by each of the historic voice command. The actions are stored in the memory 160, and are executed by the processor 130 by executing the historic voice command.

The processor 130 is configured to perform the at least one action by executing the voice command based on the context. For example, at least one of the voice search unit 120, the query construction unit 140, and the knowledge based unit 170 may be included in the processor 130 or may be functional blocks whose functions are executed by the processor 130. In addition, every element in the electronic device 100 is coupled to the processor 130, and may be operated according to a control by the processor. Thus, operations of the elements in the electronic device 100 may be interpreted as operations of the processor 130.

The query construction unit 140 translates (if required) the NLU command of the user to a machine understandable format to produce the required results.

In an exemplary embodiment, the audio receiver 110 is configured to receive the first voice command associated with the first application from the user, the context identification unit 126 is configured to determine the relationship between the first voice command and the context of at least one historic voice command associated with the first application, and the processor 130 is configured to perform the at least one action by executing the voice command based on the context of the at least one historic voice command associated with the first application.

Further, the audio receiver 110 is configured to receive the second voice command associated with the second application from the user, the context identification unit 126 is configured to determine the relationship between the second voice command and the context of the at least one historic voice command associated with the first application, and the processor 130 is configured to perform the at least one action by executing the second voice command based on the context of at least one historic voice command associated with the first application.

Figure 19A:
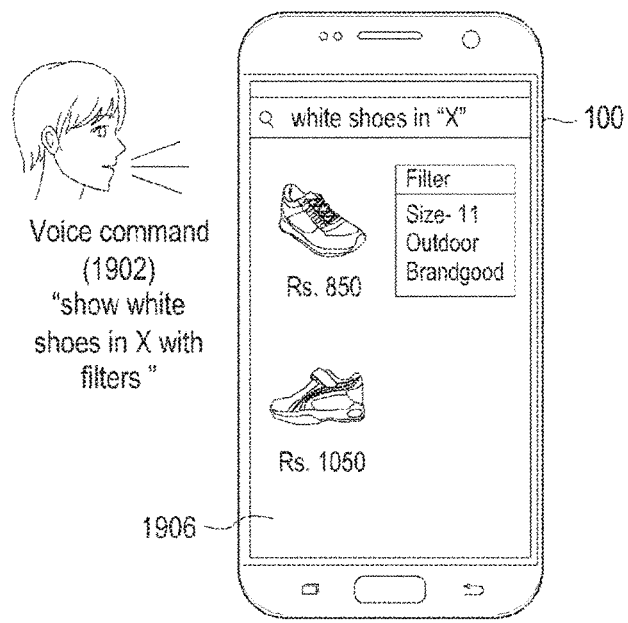
FIGS. 19A and 19B illustrate an example of a method is used to perform one or more voice based actions in the electronic device, according to an exemplary embodiment.
Figure 19B:
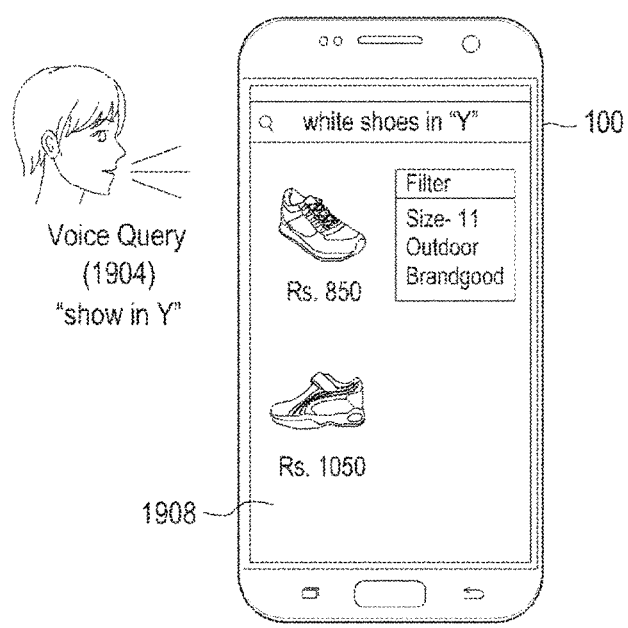

For example, one or more exemplary embodiments may allow the user to switch the search application along with the provided item, and thus circumvent the user to provide another voice query in order to perform the action/search in the switched search application, as detailed in FIGS. 19A-19B.

Figure 8:
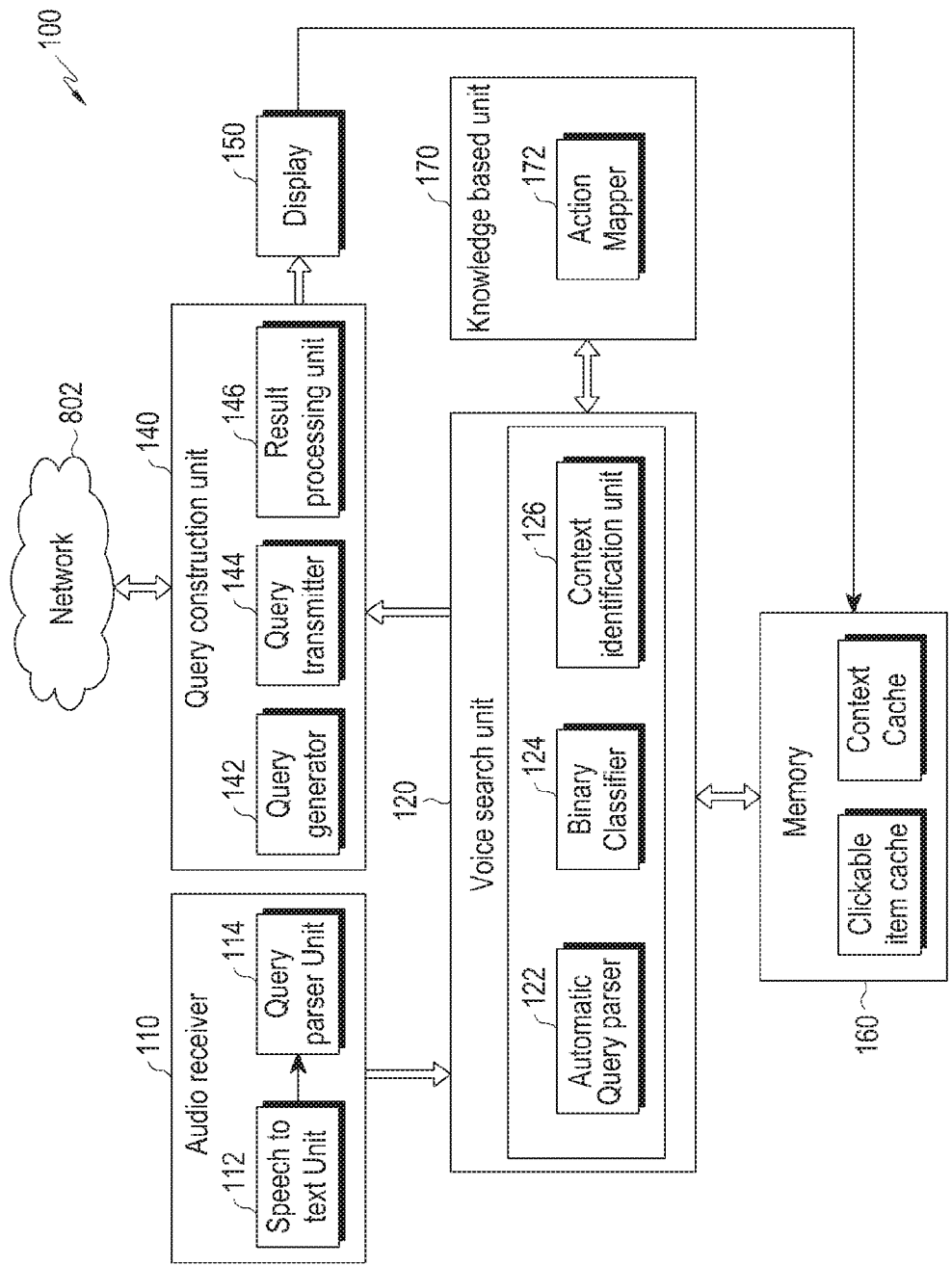
FIG. 8 illustrates an electronic device configured to perform one or more voice based actions, according to an exemplary embodiment.

FIG. 8 is an architecture of the electronic device 100 configured to perform one or more voice based actions, according to an exemplary embodiment.

The audio receiver 110 includes a speech to text unit 112 configured to convert the voice command (received from the user) into the written word/statement. Further, the audio receiver 100 includes a query parser unit 114 configured to translate a search string (i.e., written instructions received from the speech to text unit 112) into specific instructions for the query construction unit 140.

The query construction unit 140 includes a query generator 142, a query transmitter 144, and a result processing unit 146. The query generator 142 translates (if required) current query to a machine understandable format using the context information. The query transmitter 144 transmits the translated query (in case of a search) to the result processing unit 146. The result processing unit 146 accumulates results/outputs based on the translated query as gathered from the network.

Voice search unit 120 includes the NLU engine and a knowledge base engine. The NLU engine receives the parsed query from an automatic query parser 122. The automatic query parser 122 is configured to parse the query automatically. Further, the NLU engine classifies the parsed query based on the type of query (search, retrieve or perform another action) and identifies the context of the query. Further, the NLU engine transmit the identified context to the knowledge base engine. The knowledge base engine maps the identified action word to an actual action based on the context of the query.

Binary classifier 124 is to classify the current command as action or comment.

Context identification unit 126 is configured to determine the relationship between the voice command and the context of at least one historic voice command of the user. The relationship is determined based on the at least one of the semantic similarity, a latent semantic similarity, and the action performed by each of the historic voice command. The actions are stored in the memory 160, and are executed by the processor 130 by executing the historic voice command.

Knowledge based unit 170 maps the identified action word to an actual action based on the context of the query Action mapper 172 includes a set of actions, associated with a particular command, to be performed. Based on the command identified, a particular action will be chosen.

Figure 9:
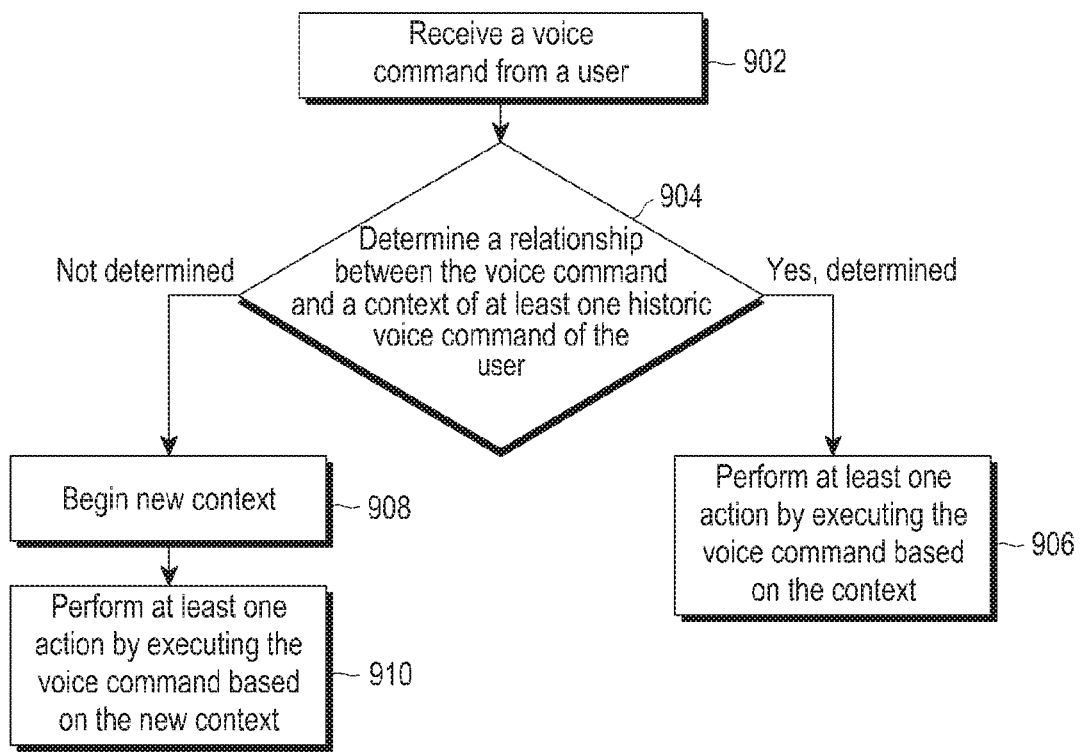
FIG. 9 illustrates a flow diagram of a method for performing the voice based actions by the electronic device, according to an exemplary embodiment.

FIG. 9 illustrates a flow diagram illustrating a method for performing the voice based actions by the electronic device 100, according to an exemplary embodiment.

Referring to FIG. 9, in operation 902, the electronic device 100 receives the voice command from the user. For example, in the electronic device 100, the audio receiver 110 receives the voice command from the user.

In operation 904, the electronic device 100 determines the relationship between the voice command and the context of at least one historic voice command of the user. For example, the context identification unit 126 determines the relationship between the voice command and the context of at least one historic voice command of the user. If the electronic device 100 determines the relationship then, in operation 906, the electronic device 100 performs the at least one action by executing the voice command based on the context. For example, in the electronic device 100, the processor 130 performs the at least one action by executing the voice command based on the context.

If the electronic device 100 determines that there is no relationship (i.e., no match) found between the voice command and the context of the at least one historic voice command of the user, in operation 908, the electronic device 100 begins a new context thereupon, and stores it accordingly. For example, in the electronic device 100, the context identification unit 126 begins the new context and stores it accordingly. In operation 910, the electronic device 100 performs the at least one action by executing the voice command based on the new context. For example, in the electronic device 100, the processor 130 performs the at least one action by executing the voice command based on the context.

The various actions, acts, blocks, steps, etc., as illustrated in FIG. 9 may be performed in the order presented, in a different order, or simultaneously. Further, in some exemplary embodiments, some of the actions, acts, blocks, steps, etc., may be omitted, added, modified, skipped, etc., without departing from the scope of the disclosure.

Figure 10:
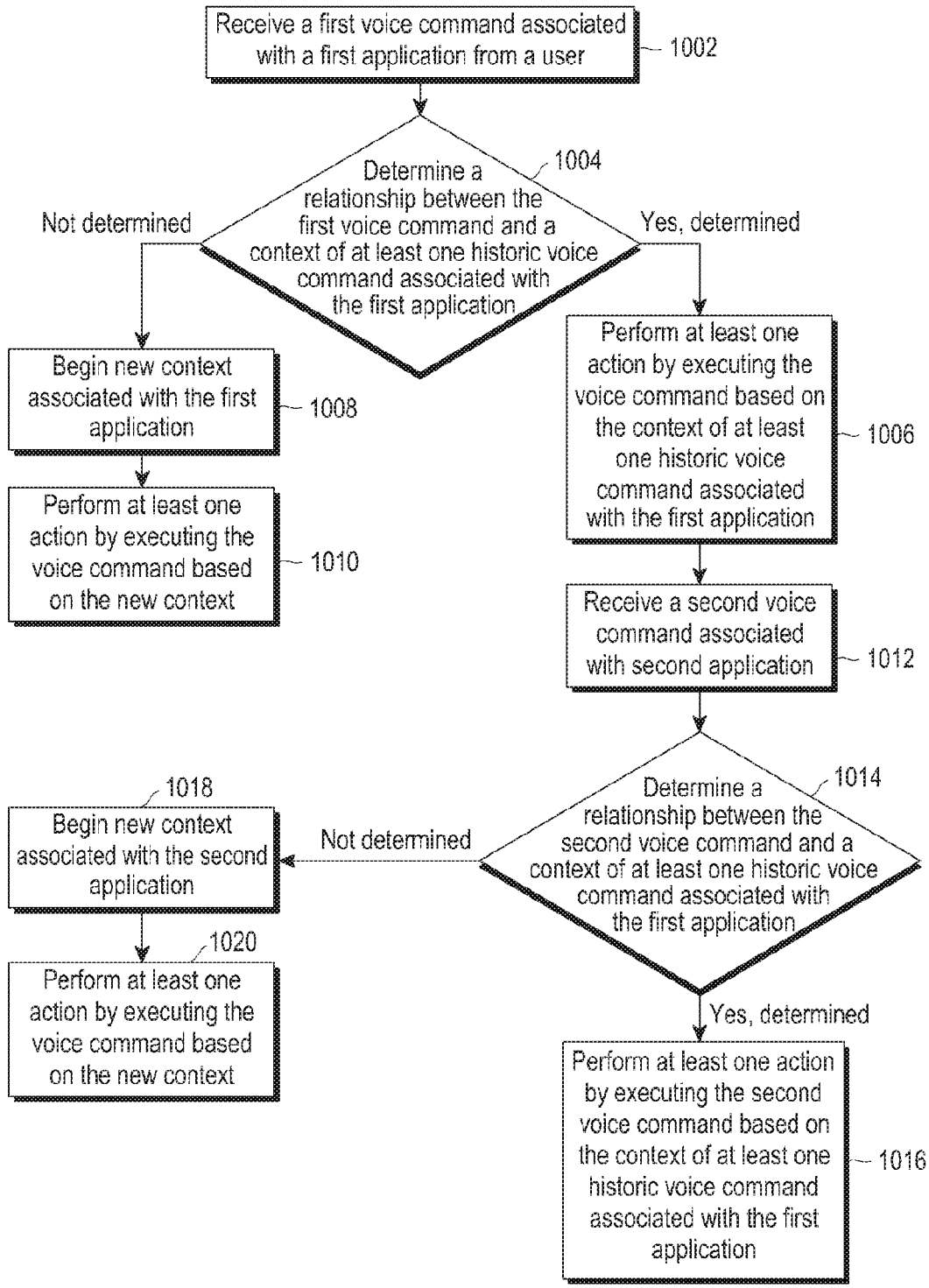
FIG. 10 illustrates a flow diagram of a method for performing the voice based actions, according to an exemplary embodiment.

FIG. 10 illustrates a flow diagram illustrating a method for performing the voice based actions, based on the one or more voice command associated with one or more applications, by the electronic device 100, according to an exemplary embodiment.

Referring to FIG. 10, in operation 1002, the electronic device 100 receives the first voice command associated with the first application from the user. For example, in the electronic device 100, the audio receiver 110 receives the first voice command associated with the first application from the user.

In operation 1004, the electronic device 100 determines the relationship between the first voice command and the context of the at least one historic voice command associated with the first application. For example, in the electronic device 100, the context identification unit 126 determines the relationship between the first voice command and the context of the at least one historic voice command associated with the first application.

If the electronic device 100 determines that there exists the relationship between the first voice command and the context of the at least one historic voice command associated with the first application, then, in operation 1006 the electronic device 100 performs the at least one action by executing the voice command based on the context of the at least one historic voice command associated with the first application. For example, in the electronic device 100, the processor 130 performs the at least one action by executing the voice command based on the context of the at least one historic voice command associated with the first application.

If the electronic device 100 determines that there is no relationship between the between the first voice command and the context of the at least one historic voice command associated with the first application, then in operation 1008 the electronic device 100 begins the new context associated with the first application. Further, in operation 1010, the electronic device 100 performs the at least one action by executing the voice command based on the new context.

In operation 1012, the electronic device 100 receives the second voice command associated with the second application from the user. For example, in the electronic device 100, the audio receiver 110 receives the second voice command associated with the second application from the user. In operation 1014, the electronic device 100 determines if there exists any relationship between the second voice command and the context of the at least one historic voice command associated with the first application. For example, in the electronic device 100, the context identification unit 126 determines if there is exists any relationship between the second voice command and the context of the at least one historic voice command associated with the first application.

If the electronic device 100 determines that there exists the relationship between the second voice command and the context of the at least one historic voice command associated with the first application, then in operation 1016, the electronic device 100 performs the at least one action by executing the second voice command based on the context of at least one historic voice command associated with the first application. For example, in the electronic device 100, the processor 130 performs the at least one action by executing the second voice command based on the context of at least one historic voice command associated with the first application.

If the electronic device 100 determines that there exists no relationship(s) between the second voice command and the context of the at least one historic voice command associated with the first application, then in operation 1018, the electronic device 100 begins a new context associated with the second application. Further, in operation 1020 the electronic device 100 perform the at least one action by executing the voice command based on the new context associated with the second application.

The various actions, acts, blocks, steps, etc., as illustrated in FIG. 10 may be performed in the order presented, in a different order, or simultaneously. Further, in some exemplary embodiments, some of the actions, acts, blocks, steps, etc., may be omitted, added, modified, skipped, etc., without departing from the scope of the disclosure.

Figure 11:
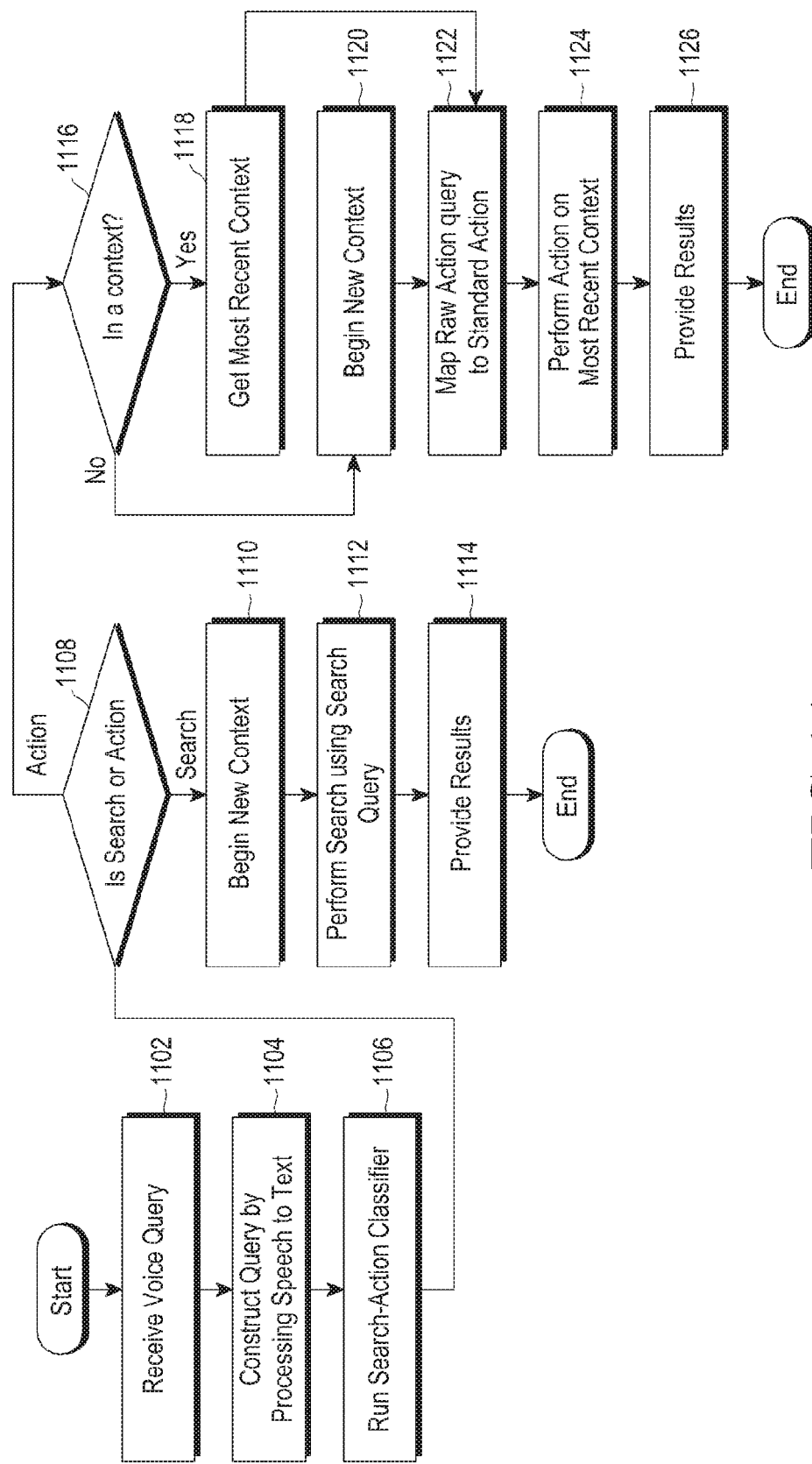
FIG. 11 illustrates a flow diagram of a method for performing the voice based actions, according to an exemplary embodiment.

FIG. 11 illustrates yet another flow diagram illustrating a method for performing the voice based actions, based on the one or more voice command associated with one or more applications, by the electronic device 100, according to an exemplary embodiment.

Referring to FIG. 11, in operation 1102 the electronic device 100 receives the voice query from the user. For example, in the electronic device 100, the audio receiver 110 receives the voice query from the user.

In operation 1104, the electronic device 100 constructs the query by processing speech to text. For example, in the electronic device 100, the speech to text unit 112 constructs the query by processing speech to text.

In operation 1106, the electronic device 100 runs the search action classifier. For example, in the electronic device 100, the binary classifier 124 runs the search action classifier.

Figure 12A:
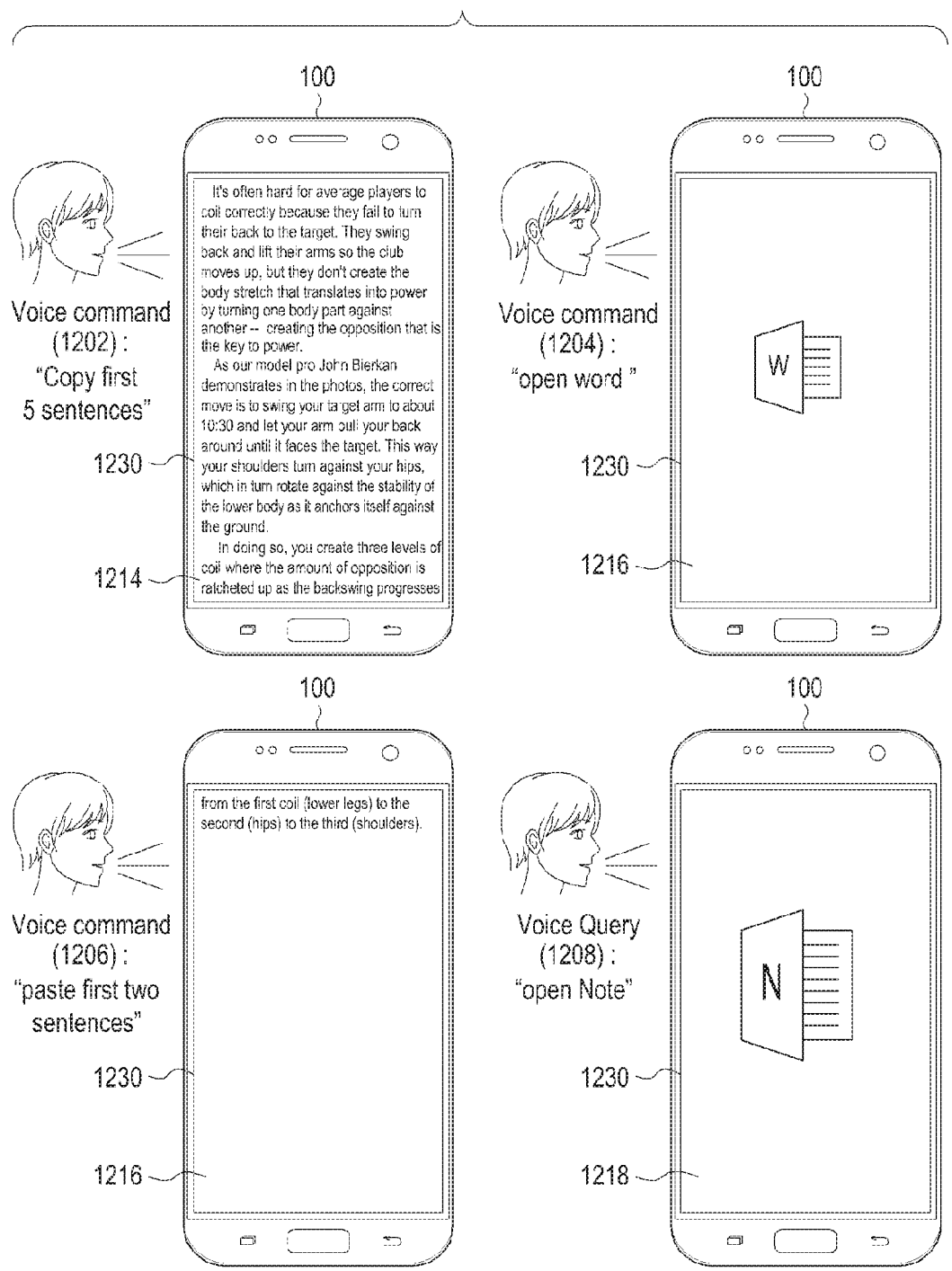
FIGS. 12A and 12B show an example illustration of an electronic device, according to an exemplary embodiment.

In operation 1108, the electronic device 100 determines whether the query is to perform a search or to perform the action. For example, in the electronic device 100, the binary classifier 124 determines whether the query is the search or the action. For example, as illustrated in FIG. 12A, the search can include launching of related application as per the user voice command (i.e., "open word," the electronic device 100 may launch the word application). Further, as illustrated in FIG. 12A, the action can include "paste the first two sentences" as per the user voice command.

If the electronic device 100 determines the query as the search, then, in operation 1110, the electronic device 100 begins a new context while considering the query as the search. For example, in the electronic device 100, the context identification unit 126 begins the new context, as detailed in conjunction with FIGS. 19A-19B.

In operation 1112, the electronic device 100 performs the search using the search query. For example, in the electronic device 100, the Voice search unit 120 performs the search using the search query.

In operation 1114, the electronic device 100 provides results related to the search query. For example, in the electronic device 100, the result processing unit 146 provides results related to the search query.

If the electronic device 100, in operation 1108, determines the query as the "Action", then, in operation 1116, the electronic device 100 further determines whether the results related to the action are in the context, as for example, in the context of the voice query. For example, in the electronic device 100, the context identification unit 126 determines whether the results related to the search query are in the context or not.

If the electronic device 100 determines the results related to the voice query/action is in the context, then, in operation 1118, the electronic device 100 retrieves the most recent context. For example, in the electronic device 100, as illustrated in FIG. 7, the context identification unit 126 retrieves the most recent context.

If the electronic device 100 determines the results related to the search query are not in the context, then, in operation 1120, the electronic device 100 begins a new context. For example, in the electronic device 100, the context identification unit 126 begins a new context.

In operation 1122, the electronic device 100 maps the raw action query to the standard action after beginning the new context or after getting the most recent context. For example, in the electronic device 100, the knowledge based unit 170 maps the raw action query to the standard action.

In operation 1124, the electronic device 100 performs action on the most recent context. For example, in the electronic device 100, the Action mapper 172 performs action on the most recent context.

In operation 1126, the electronic device 100 provides the results. For example, in the electronic device 100, the result processing unit 146 provides the results.

The various actions, acts, blocks, steps, etc., as illustrated in FIG. 10 may be performed in the order presented, in a different order, or simultaneously. Further, in some exemplary embodiments, some of the actions, acts, blocks, steps, etc., may be omitted, added, modified, skipped, etc., without departing from the scope of the disclosure FIGS. 12A and 12B show an example illustration of the electronic device 100 performing the one or more voice based actions based on the relationship between the voice command and the context of the at least one historic voice command of the user, according to an exemplary embodiment.

Figure 12B:
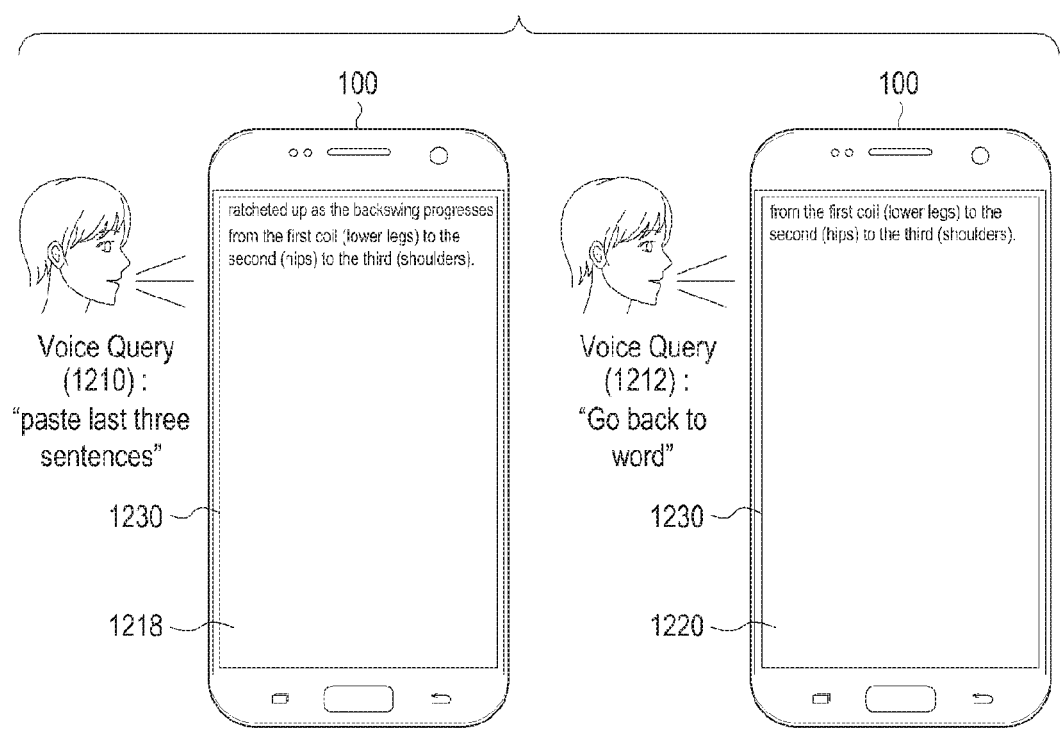

Referring to FIGS. 12A and 12B, the user commences with a user input (i.e., voice query/voice input query) through a voice command 1202, such as: "copy first 5 sentences" from an application 1214 currently rendered on a display 1230 (similar to the display 150). The context "first 5 sentences" is been stored by the memory 160 coupled to the context identification unit 126. The application 1214 may be any application having the capability of displaying/providing the content/item therein. The audio receiver 110 may receive the voice command 1202 and may communicate an output (output such as; converting the voice command 1202 from speech to text and the query parser unit 114 to interpret and execute the voice command 1202) to the processor 130 coupled to the context identification unit 126.

Further, the user may provide a voice command 1204 to the electronic device 100 (i.e., received by the audio receiver 110), such as, "Open Word". The context identification unit 126 may perform latent semantic analysis (LSA) from a corpus of words and supported commands to find the most relevant command that the user might have intended to use. The most relevant application or applications, as for example, a word application 1216, may be launched by the electronic device 1200.

The context identification unit 126 determines the relationship between the voice command 1204 and the context of the least one historic voice command of the user. The historic voice command, for example, the voice command 1202, and the context, for example, "copy first 5 sentences" and application 1214, associated with the voice command 1202, may be stored in a context cache (or, for example, related context may be saved in the memory 160).

The processor 130 may perform the action based on the context, such as, launching the word application and/or document 1216 and displaying the same on the display 1230. The context, for example, may now include "copy first 5 sentences," "open word," and the application 1216, and may be stored in the memory 160 associated with the voice command 1204.

The user may, further, provide a voice command 1206 to the electronic device 100 (i.e., received by the audio receiver 110), such as, "Paste first two sentences" while the application 1216 is in active state. The context identification unit 126 may determine the relationship between the voice command 1206 and the context of the at least one historic voice command, for example, context associated with the voice command 1202 and the voice command 1204.

Thus, the processor 130 may perform the action by executing the voice command 1206, such as, "paste the first two sentences" into the "application 1206". The context associated with the voice command 1206 may include "paste the first two sentences", the "application 1206".

The user yet again, may provide a voice command 1208 to the electronic device 100 (i.e., received by the audio receiver 110), such as, "Open Note". The context identification unit 126 may determine the relationship between the voice command 1208 and the context associated with the at least one historic voice command, for example, context associated with the voice command 1202, the voice command 1204, and the voice command 1206.

Thus, the processor 130 may perform the action by executing the voice command 1208, such as, "opening of the note application 1218". The context associated with the voice command 1208 may include "open note" and the "note application 1218".

Further, the user may provide a voice command 1210 to the electronic device 100 (i.e., received by the audio receiver 110), such as, "Paste last three sentences" while the application 1218 is in the active state. The context identification unit 126 may determine the relationship between the voice command 1210 and the context of the at least one historic voice command, for example, context associated with the voice command 1202, the voice command 1204, the voice command 1206, and the voice command 1208.

Thus, the processor 130 may perform the action by executing the voice command 1210. The action such as, "pasting the last three sentences" in the note application 1218. The context associated with the voice command 1210 is "paste last three sentences" and the "note application 1218" is stored in the memory 160.

In an exemplary embodiment, the user may provide a voice command 1212 to the electronic device 100 (i.e., received by the audio receiver 110), such as, "Go back to word". The context identification unit 126 may determine the relationship between the voice command 1212 and the context of the at least one historic voice command, for example, context associated with the voice command 1202, the voice command 1204, the voice command 1206, the voice command 1208, and the voice command 1210.

Based on the context, the processor 130 may perform the action, such as, navigating back to the word application 1216.

In an exemplary embodiment, the context identification unit 126 may perform latent semantic analysis (LSA) from a corpus of words and supported commands to find the most relevant command that the user might have intended to use. For example, if the voice command is start "application". Thus, the context identification unit 126 may analyze the voice command 1204 and may search the most relevant application using the LSA, as the supported command in the voice command may be open/launch the application. A previous command is necessary to set the context for these commands. The processor 130 may contain a set of rules that will define these parasitic commands and their context search. For example, "Paste" command can only exist if there is a preceding "Copy" command. The rule here would be to search for the most recent "Copy" command in the context cache (or, for example, stored in the memory 160), "Close" command has to be preceded by the "Open" command. The rule here would be to search for the most recent open command in the context cache. "Go back" command without any context should automatically point to the most recent stored context. "Resume" command has to be preceded by a "pause" command. The rule here would be to search for the most recent pause.

Figure 13A:
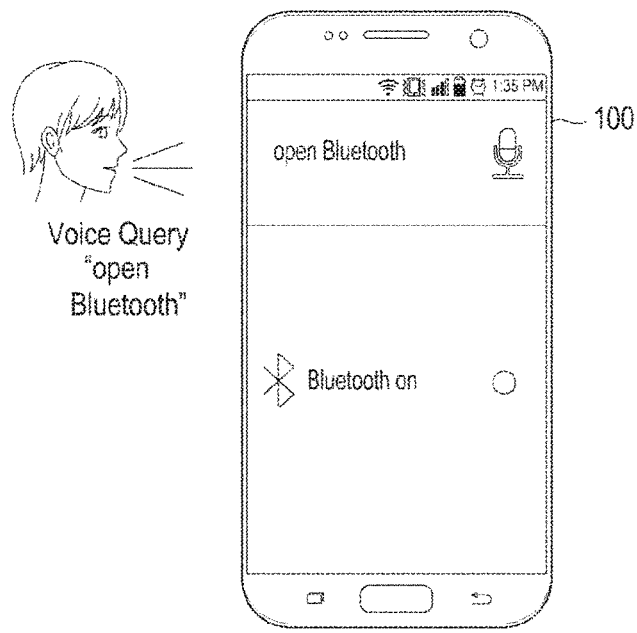
FIGS. 13A and 13B illustrate an example of a method to perform one or more voice based actions in the electronic device, according to an exemplary embodiment.
Figure 13B:
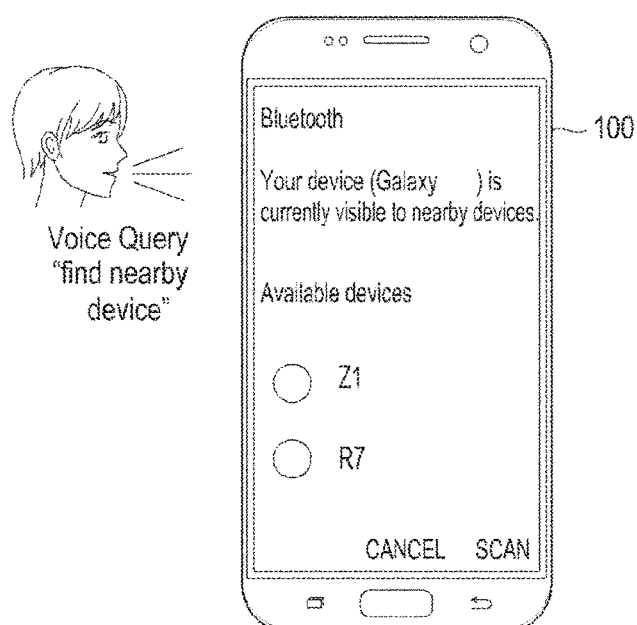

FIGS. 13A and 13B illustrate another use case scenario in which the method is used to perform the one or more voice based actions in the electronic device 100, according to an exemplary embodiment.

Unlike the related art method discussed above with reference to FIGS. 1A and 1B, if the user, in an exemplary embodiment, queries "Open Bluetooth" to connect to another electronic device, Bluetooth is opened (as shown in FIG. 13A) and context ("Bluetooth") is stored. Further, the user queries "list nearby devices" to get a list of nearby electronic devices (as shown in FIG. 13B). A list of the nearby electronic device is shown and the context is changed to ("Bluetooth", "list of nearby devices").

Figure 14A:
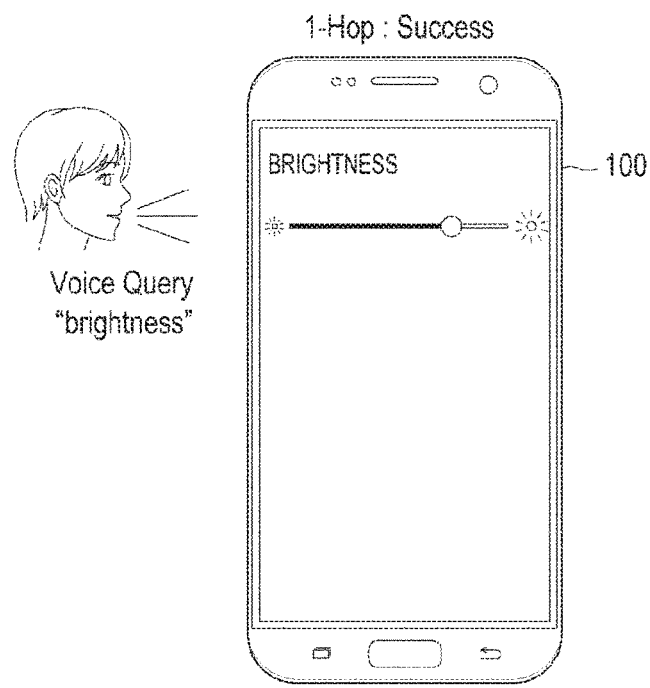
FIGS. 14A and 14B illustrate an example of a method to perform one or more voice based actions in the electronic device, according to an exemplary embodiment.
Figure 14B:
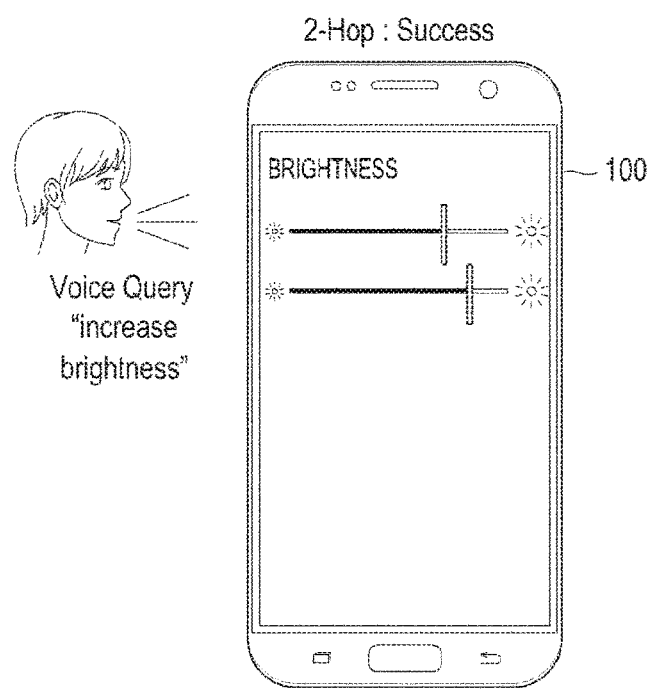

FIGS. 14A and 14B illustrate yet another use case scenario in which the method is used to perform the one or more voice based actions in the electronic device 100, according to an exemplary embodiment.

Unlike the related art method discussed above with reference to FIGS. 2A and 2B, if the user, in an exemplary embodiment, queries "Brightness" to open brightness slider (as shown in FIG. 14A), the context ("Brightness") is stored. Further, the user queries "increase brightness" (or "decrease brightness") to change the level of the brightness in the brightness slider (as shown in FIG. 14B) and the context is changed to "Brightness", "increase" (or to "Brightness", "decrease".

Figure 15A:
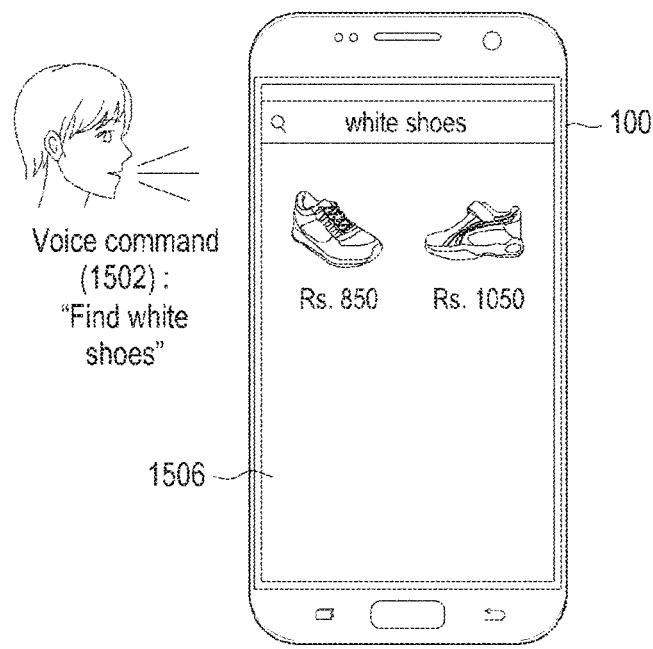
FIGS. 15A and 15B illustrate an example of a method to perform one or more voice based actions in the electronic device, according to an exemplary embodiment.
Figure 15B:
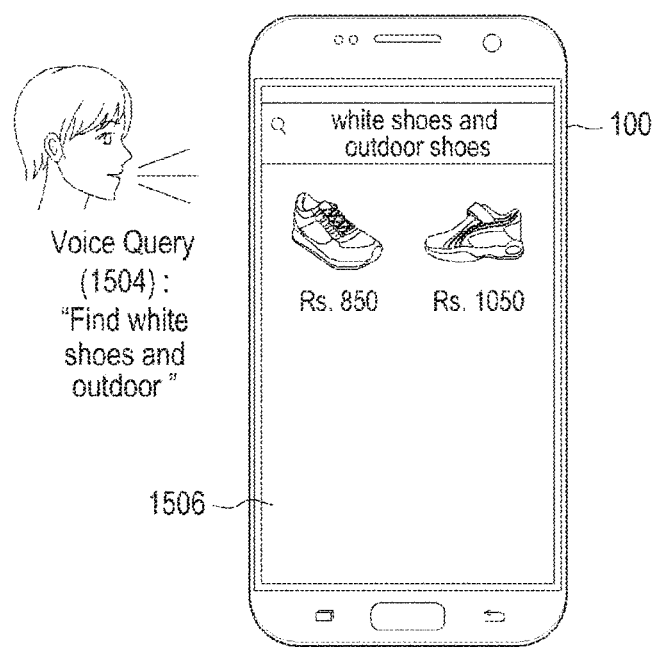

FIGS. 15A and 15B illustrate yet another use case scenario in which the method is used to perform the one or more voice based actions in the electronic device 100, according to an exemplary embodiment.

Unlike the related art method discussed above with reference to FIGS. 3A-3B, the user queries 1502, in an exemplary embodiment, "find white shoes" in the application 1506. The electronic device 100 may provide the user with lists of the "white shoes" available in the application 1506 (as shown in FIG. 15A). Further, if the user queries 1504 "find white sports shoes and outdoor shoes" in the application 1506, the context identification unit 126 identifies the relationship between the voice command (user query 1504) and the context ("white shoes") of at least one historic voice command (i.e., of a user query 1502). Thus, the processor 130 performs the at least one action by executing the voice command, i.e., a user query 1504, based on the context. The action, such as providing the lists of "white shoes" under the category of outdoor (as shown FIG. 15B). The context identification unit 126 may change the context to ("white shoes" and "outdoor shoes").

Figure 16A:
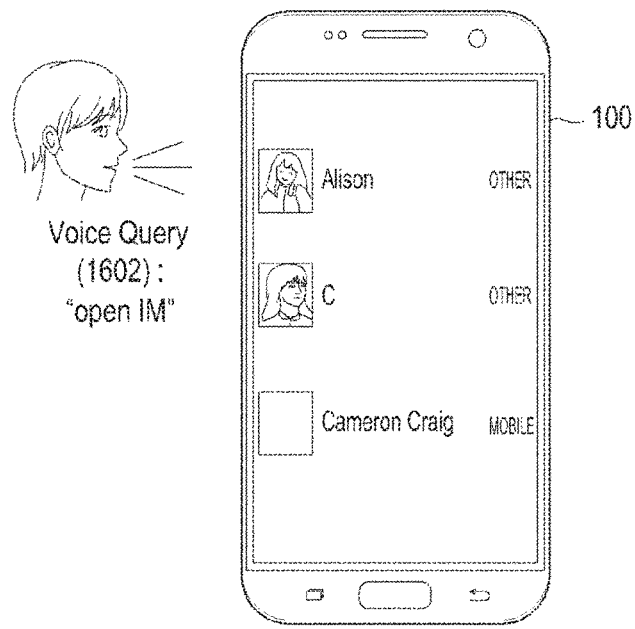
FIGS. 16A and 16B illustrate an example of a method to perform one or more voice based actions in the electronic device, according to an exemplary embodiment.
Figure 16B:
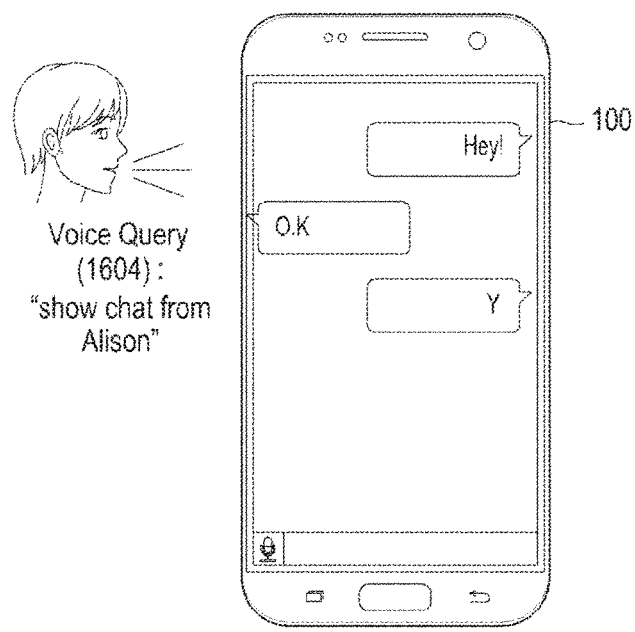

FIGS. 16A and 16B illustrate yet another use case scenario in which a method is used to perform the one or more voice based actions in the electronic device 100, according to an exemplary embodiment.

Unlike the related art method discussed above with reference to FIGS. 4A-4B, if the user queries 1602, in an exemplary embodiment, an instant messaging (IM) application 1606, the IM application 1606 is opened and context ("M") is stored in the memory 160. The user queries 1604 "show chat from Alison". The context identification unit 126 identifies the relationship between the voice command (user query 1604) and the context ("M") of at least one historic voice command (i.e., user query 1602). Thus, the processor 130 performs the at least one action by executing the voice command, i.e., a user query 1604, based on the context. The action, such the chat window for "Alison" is opened and context is updated to ("Instant Messaging", "chat from Alison").

Further, in an exemplary embodiment, if the user queries "Open Gallery," the gallery is opened and context ("gallery") is stored. If the user further queries "show album," album window for "Alison" is opened and context is updated to "Gallery, Album".

Figure 17A:
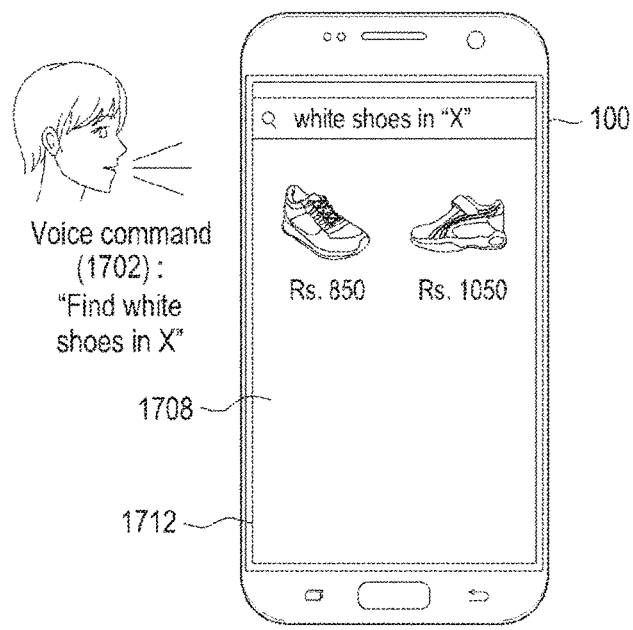
FIGS. 17A, 17B, and 17C illustrate an example of a method to perform one or more voice based actions in the electronic device, according to an exemplary embodiment.
Figure 17B:
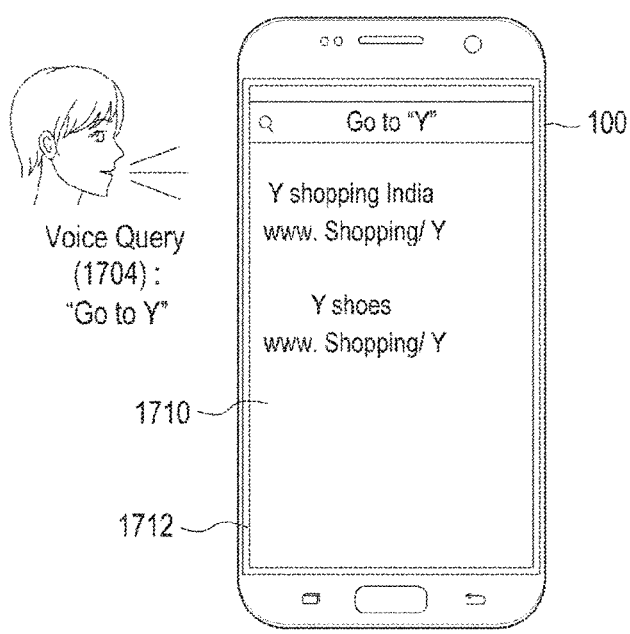
Figure 17C:
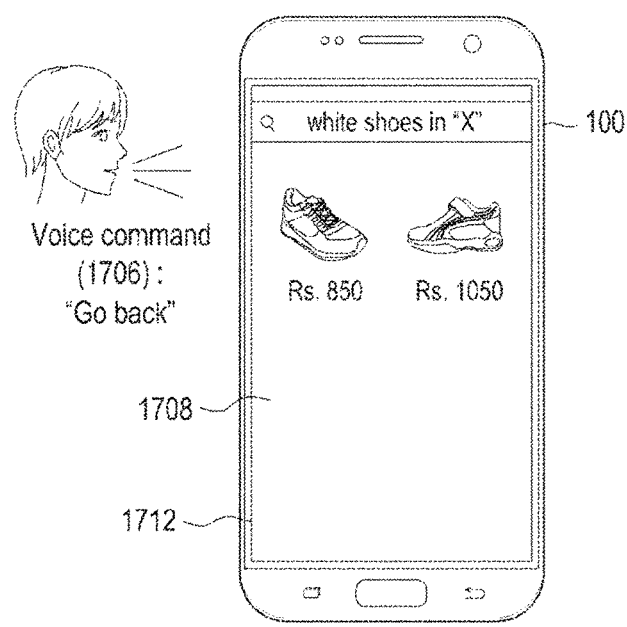

FIGS. 17A, 17B, and 17C illustrate yet another use case scenario in which a method is used to perform the one or more voice based actions in the electronic device 100, according to an exemplary embodiment.

Unlike the related art method discussed above with reference to FIGS. 5A, 5B, and 5C, if the user queries 1702 "find shoes in "X" source application 1708 as shown in FIG. 17A, the processor 130 may perform the action by executing the user query 1702 and may display the result (i.e., shoes in X source) on a display 1712 (i.e., display 150). The context "shoes in X" is stored in the memory 160. Further, if the user queries 1704, "Go to "Y" application 1710 (as shown in FIG. 17B), the processor 130 may perform the action by executing the user query 1704. Furthermore, if the user queries 1706, "Go back", the context identification unit 126 may determine the relationship between the user query 1706 and the at least one context of the historic voice command (i.e., voice query 1702 and voice query 1704), thus, the processor 130 may perform the action by executing the user query 1706, such as, navigating back to the application 1708 (as shown in FIG. 17C).

Figure 18A:
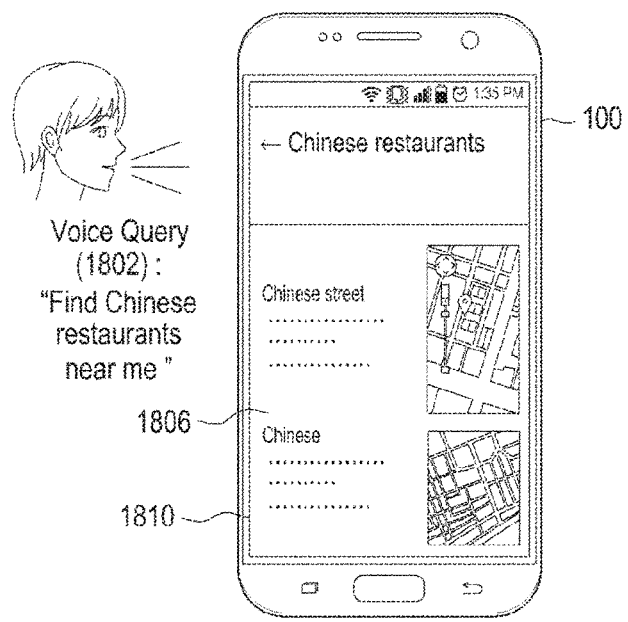
FIGS. 18A and 18B illustrate an example of a method to perform the one or more voice based actions in the electronic device, according to an exemplary embodiment.
Figure 18B:
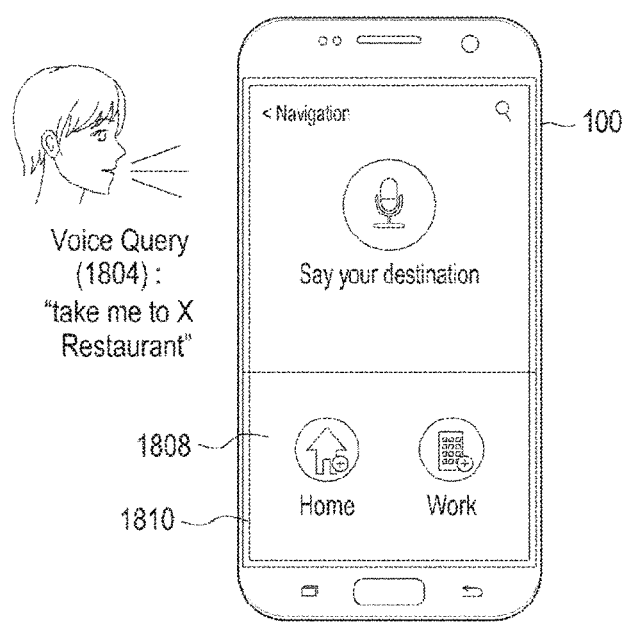

FIGS. 18A and 18B illustrate yet another use case scenario in which a method is used to perform the one or more voice based actions in the electronic device 100, according to an exemplary embodiment.

In an example scenario, considering the related art systems, the user while driving wants to go to nearby Chinese restaurant. The user is not sure and wants to see the available options. The user queries "find Chinese restaurant nearby". No result is returned, since navigation application can only navigate to specific locations. Unlike such related art scenarios, in one or more exemplary embodiments, a list of Chinese restaurants in text is returned in response to the user query 1802 from an application 1806 and displayed by the display 1810 (similar to the display 150). The context "Chinese restaurant nearby" is stored in the memory 160. The user likes restaurant "X" and queries (i.e., voice command 1804) "take me to X". The context identification unit 126 determines the relationship between the voice command 1804 and the context associated with the voice command 1804. The processor 130, in response to the relationship determined, may trigger launch of the application 1808 to navigate the user to the direction corresponding to "X" restaurant from current location of the user.

FIGS. 19A and 19B illustrate yet another use case scenario in which a method is used to perform the one or more voice based actions in the electronic device 100, according to an exemplary embodiment.

Unlike the related art method discussed above with reference to FIGS. 6A-6B, the processor 130 may switch the application 1906 (i.e., multiple sources) based on the context of the at least one historic voice command/queries provided by the user. For example, the audio receiver 110 may receive a first voice command 1902 with a context "show white shoes in X source. Further, the audio receiver 130 may receive a second voice query for applying filters (i.e., size, brand, etc.), the context identification unit 126 may determine a relationship between the second voice command and the context of the first voice command 1902 associated with the application 1906. The processor 130 may execute the first voice command 1902 and display the result obtained therefrom the X source 1906 accompanied with the filters applied within the window (i.e., User Interface) of the X source.

Further, while the user currently viewing the results of first voice command 1902 within the window of the X source thereof the user may provide a third voice command 1904 with a context "show in Y source," the context identification unit 126 may determine a relationship between the third voice command 1904 and a context of the at least the first voice command 1902 and the second voice command associated with the first application 1906. For example, the context of the term "show" is in relation with the first voice command 1902 and the third voice command 1904.

The processor 130 may execute the third voice command 1904 with the applied filter (as provided by way of the second voice command) in the Y source 1908 and display the result obtained therefrom the Y source 1908 within the window (i.e., User Interface) of the Y source, thus, obviating the user to input a new voice query related to the voice query 1902 along with the filters associated therewith. Thus, the queries may be used over multiple sources.

In the related, the user uses touch to explore the options. The limitation however is that user thought sequence is difficult to capture. Unlike such related art scenarios, in one or more exemplary embodiments, the user queries using voice and the search results are returned in the form of a list. The user further uses voice based depth search commands to explore the content in depth. Thus, in one or more exemplary embodiments, user's thoughts are captured in the form of text which may be used for sequence pattern mining and association rule mining.

Figure 20:
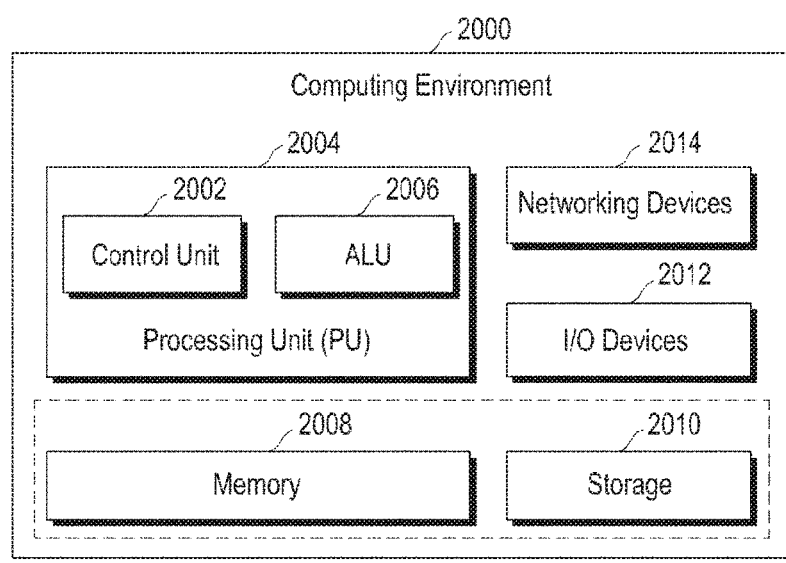
FIG. 20 illustrates a computing environment implementing the method and electronic device for performing voice based actions, according to an exemplary embodiment.

FIG. 20 illustrates a computing environment 2000 implementing the method of electronic device 100 for performing voice based actions, according to an exemplary embodiment. As depicted in FIG. 20, the computing environment 2000 includes at least one processing unit 2004 that is equipped with a control unit 2002 and an Arithmetic Logic Unit (ALU) 2006, a memory 2008, a storage unit 2010, a plurality of networking devices 2014, and a plurality Input output (I/O) devices 2012. The processing unit 2004 is responsible for processing the instructions of the schemes. The processing unit 2004 receives commands from the control unit 2002 in order to perform its processing. Further, any logical and arithmetic operations involved in the execution of the instructions are computed with the help of the ALU 2006.

The overall computing environment 2000 may be composed of multiple homogeneous or heterogeneous cores, multiple CPUs of different kinds, special media and other accelerators. The processing unit 2004 is responsible for processing the instructions of the schemes. Further, the plurality of processing units 2004 may be located on a single chip or over multiple chips.

The scheme including of instructions and codes required for the implementation are stored in either the memory 2008 or the storage 2010 or both. At the time of execution, the instructions may be fetched from the corresponding memory 2008 or storage unit 2010, and executed by the processing unit 2004.

In case of any hardware implementations various networking devices 2014 or external I/O devices 2012 may be connected to the computing environment to support the implementation through the networking unit and the I/O device unit.

The exemplary embodiments may be implemented through at least one software program running on at least one hardware device and performing network management functions to control the elements. The elements shown in FIGS. 7 through 20 include blocks which may be at least one of a hardware device, or a combination of hardware device and software units.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for performing voice based actions by an electronic device, the method comprising:
    receiving, by the electronic device, a first voice command associated with a first application;
    determining, by the electronic device, a relationship between the first voice command and a context of at least one historic voice command associated with the first application;
    based on determining that there is the relationship between the first voice command and the context of the at least one historic voice command associated with the first application, performing, by the electronic device, at least one first action by executing the first voice command based on the context of the at least one historic voice command associated with the first application;
    receiving, by the electronic device, a second voice command associated with a second application different from the first application;
    determining, by the electronic device, a relationship between the second voice command and the context of the at least one historic voice command associated with the first application; and
    based on determining that there is the relationship between the second voice command and the context of the at least one historic voice command associated with the first application, performing, by the electronic device, at least one second action by executing the second voice command with respect to the second application based on the context of the at least one historic voice command associated with the first application.

2. The method of claim 1, further comprising:
based on determining that there is no relationship between the first voice command and the context of the at least one historic voice command, beginning a new context based on the first voice command, and performing, by the electronic device, the at least one first action by executing the first voice command based on the new context.

3. The method of claim 1, wherein the context of the at least one historic voice command is pre-analyzed and stored in the electronic device.

4. The method of claim 1, wherein the context of the at least one historic voice command is dynamically updated.

5. The method of claim 1, wherein the determining the relationship between the first voice command and the context of the at least one historic voice command comprises determining the relationship between the first voice command and the context of the at least one historic voice command based on at least one among a semantic similarity, a latent semantic similarity, and an action performed based on the at least one historic voice command.

6. The method of claim 1, further comprising:
based on determining that there is no relationship between the second voice command and the context of the at least one historic voice command associated with the first application, beginning a new context based on the second voice command, and performing, by the electronic device, the at least one second action by executing the second voice command based on the new context.

7. The method of claim 1, wherein the at least one first action comprises a search, and
the performing the at least one first action comprises:
  beginning a new context based on the first voice command,
  performing the search based on the first voice command, and
  presenting a result of the search based on the first voice command.

8. The method of claim 1, wherein the at least one first action is performed by executing the first voice command based on a most recent context.

9. An electronic device for performing voice based actions, the electronic device comprising:
an audio receiver configured to receive a first voice command associated with a first application; and
at least one microprocessor configured to:
  determine a relationship between the first voice command and a context of at least one historic voice command associated with the first application,
  based on determining that there is the relationship between the first voice command and the context of the at least one historic voice command associated with the first application, perform at least one first action by executing the first voice command based on the context of the at least one historic voice command associated with the first application,
wherein the audio receiver is further configured to:
  receive a second voice command associated with a second application different from the first application, and
wherein the at least one microprocessor is further configured to:
  determine a relationship between the second voice command and the context of the at least one historic voice command associated with the first application, and
  based on determining that there is the relationship between the second voice command and the context of the at least one historic voice command associated with the first application, perform at least one second action by executing the second voice command with respect to the second application based on the context of the at least one historic voice command associated with the first application.

10. The electronic device of claim 9, wherein the at least one microprocessor is further configured to, based on determining that there is no relationship between the first voice command and the context of the at least one historic voice command, begin a new context based on the first voice command, and perform the at least one first action by executing the first voice command based on the new context.

11. The electronic device of claim 9, wherein the context of the at least one historic voice command is pre-analyzed and stored in the electronic device.

12. The electronic device of claim 9, wherein the context of the at least one historic voice command is dynamically updated.

13. The electronic device of claim 9, wherein the at least one microprocessor is further configured determine the relationship between the first voice command and the context of the at least one historic voice command based at least one among a semantic similarity, a latent semantic similarity, and an action performed based on the at least one historic voice command.

14. The electronic device of claim 9, wherein the at least one microprocessor is further configured to, based on determining that there is no relationship between the second voice command and the context of the at least one historic voice command associated with the first application, begin a new context based on the second voice command, and perform the at least one second action by executing the second voice command based on the new context.

15. The electronic device of claim 9, wherein the at least one first action comprises a search, and
the at least one microprocessor is further configured to:
  begin a new context based on the first voice command,
  perform the search based on the first voice command, and
  present a result of the search based on the first voice command.

16. The electronic device of claim 9, wherein the at least one first action is performed by executing the first voice command based on a most recent context.

17. A method comprising:
receiving, by a mobile device, a first voice command associated with a first application;
determining a first intent for the first voice command by parsing the first voice command;
matching the first intent with a pre-stored context of a previous user command;
performing, by the mobile device, a first action associated with the first application by executing the first voice command based on the matching of the first intent with the pre-stored context;

receiving, by the mobile device, a second voice command associated with a second application different from the first application;

determining a second intent for the second voice command by parsing the second voice command;

matching the second intent with the pre-stored context of the previous user command and the first application; and performing, by the mobile device, a second action by executing the second voice command with respect to the second application based on the matching of the second intent with the pre-stored context within the first application.

18. The method of claim 1, wherein the at least one first action is executed based on a content used in the first application, and the at least one second action is executed based on at least a part of the content used in the first application.

19. The electronic device of claim 9, wherein the at least one first action is executed based on a content used in the first application, and the at least one second action is executed based on at least a part of the content used in the first application.

20. The method of claim 17, wherein the first action is executed based on a content used in the first application, and the second action is executed based on at least a part of the content used in the first application.

* * * * *